No. 769,828. PATENTED SEPT. 13, 1904.
T. F. MOORE.
EXCAVATING APPARATUS.
APPLICATION FILED OCT. 7, 1903.
NO MODEL. 2 SHEETS—SHEET 1.
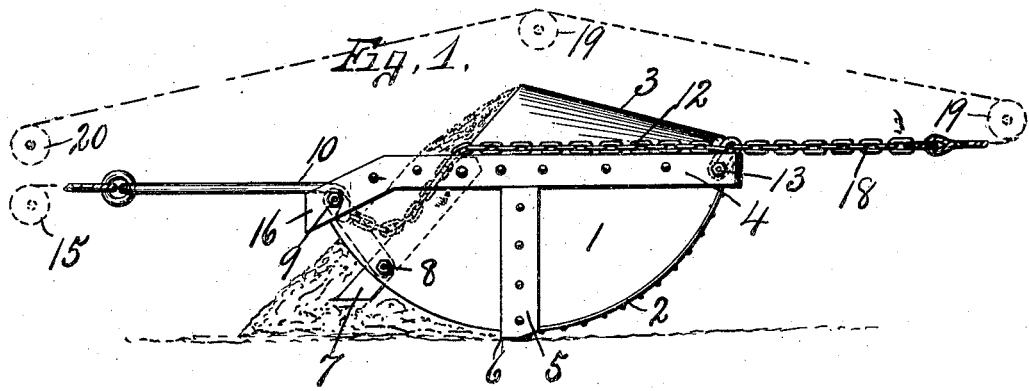
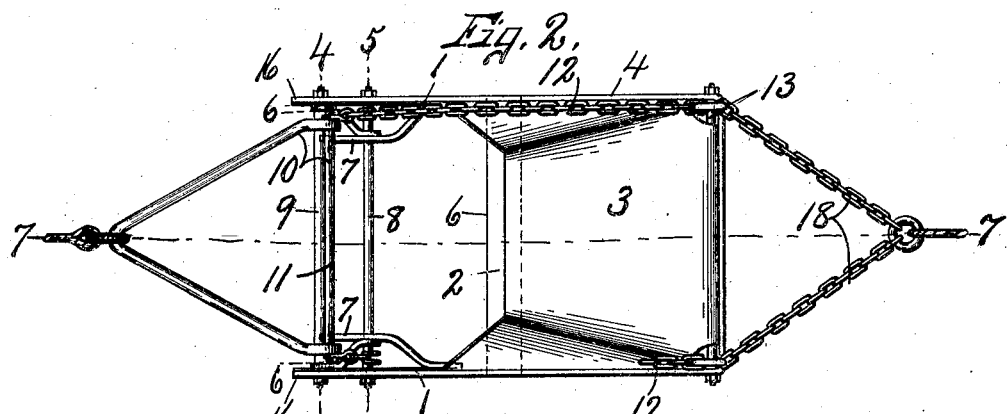
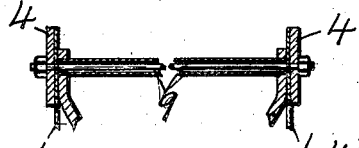
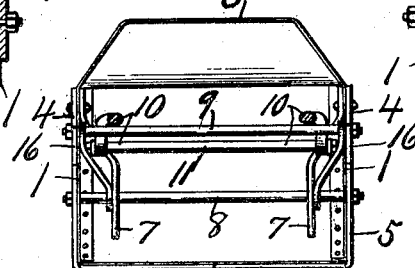
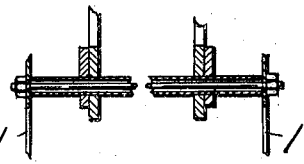
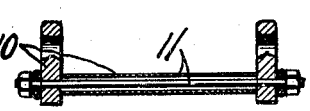

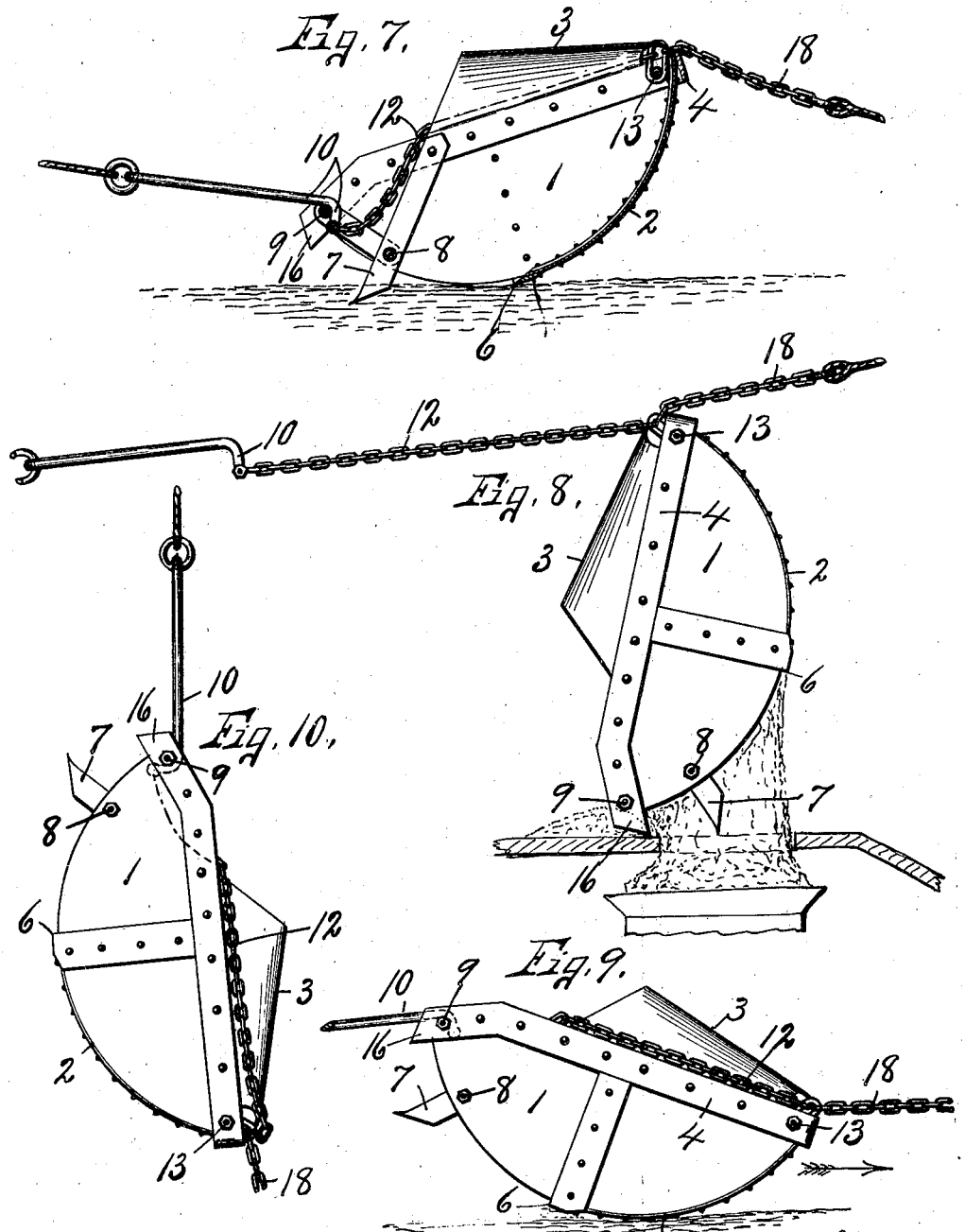

No. 769,828. Patented September 13, 1904.

UNITED STATES PATENT OFFICE.

THOMAS F. MOORE, OF SYRACUSE, NEW YORK.

EXCAVATING APPARATUS.

SPECIFICATION forming part of Letters Patent No. 769,828, dated September 13, 1904.

Application filed October 7, 1903. Serial No. 176,050. (No model.)

*To all whom it may concern:*

Be it known that I, THOMAS F. MOORE, of Syracuse, in the county of Onondaga, in the State of New York, have invented new and useful Improvements in Excavator Apparatus, of which the following, taken in connection with the accompanying drawings, is a full, clear, and exact description.

This invention relates to improvements in excavating apparatus, and is particularly useful in dredging waterways and also for trenching and similar uses.

The primary object is to reduce the expense and labor incidental to the operation of such a device and to render the same practically automatic in its filling, releasing, hauling, and dumping.

One of the specific objects is to cause the shovel to dig or plow into the earth while being hauled forward and to cause the filling or load to automatically rock the shovel so that its cutting or digging edge is deflected upwardly, whereby the loaded shovel is caused to ride upwardly to and upon the surface of the ground as it is being hauled forwardly.

Another specific object is to connect the hauling attachment at points in front and at the rear of the cutting edge, so that by detaching the front connection the pull will be exerted upon the rear end of the scraper to invert the same for discharging the load, or the front connection may remain attached and the shovel hoisted in a vertical position and conveyed in this position with the load to any desired locality, where it may be dumped by simply disconnecting the front or, in this latter instance, the upper attachment and allowing the shovel to swing to an inverted position upon the rear connection.

Other objects will appear in the subsequent description.

In the drawings, Figures 1, 2, and 3 are respectively side elevation, top plan, and end views of my improved excavating apparatus. Figs. 4, 5, and 6 are sectional views taken, respectively, on lines 4 4, 5 5, and 6 6 of Fig. 2. Fig. 7 is a longitudinal vertical sectional view taken on line 7 7, Fig. 2, the shovel being shown in the position assumed when the draft or pull is exerted upon the front end in the act of digging or excavating when loading. Fig. 8 is a side elevation of the device seen in Fig. 1, the shovel being shown in its inverted position assumed when dumping or discharging its load, the front connection being detached and the pull being exerted upon the rear end of the shovel. Fig. 9 is a side elevation of the same mechanism, showing the shovel in its position assumed when it is being returned or drawn backwardly for refilling, the position of the shovel in either case being substantially the same. Fig. 10 is a side elevation of the same mechanism, showing the shovel in the position when hoisting with a load.

Similar reference characters indicate corresponding parts in all the views.

In the use of a shovel or other digging devices for deepening waterways and in many other places where it is impracticable to use laborers to control the operation of the excavating device it is desirable to render the digging operation substantially automatic—that is, to enable it to enter the earth or bed until the excavator is filled and then to immediately draw to the surface of the ground along which it may be hauled to the locality where it is desired to dump or discharge the load.

The device which forms the subject-matter of this application is designed for this purpose to be controlled, preferably, from a distant engine or other power winding and rewinding mechanism for hauling the filled excavator in one direction and returning it empty to be refilled.

In carrying out the objects of this invention I provide a shovel consisting of opposite side walls 1, a bottom 2, and a top 3, the sides 1 being normally disposed in a vertical position with their upper edges straight and substantially horizontal and strengthened by a reinforcing band or bar 4. Their lower edges are nearly semicircular in outline, while the bottom 2 is united to the lower rear edges of the side walls and terminates practically midway between the front and rear ends of the side walls, so that the lower edge of the bottom extends transversely of the line of draft and between the side walls. This transverse cutting edge is reinforced by a band 5, of heavier iron or steel, which is extended upwardly and is secured to the side walls 1, thereby further strengthening the shovel by tying the sides and bottom together, and the cutting edge of the bottom is preferably formed upon the front edge of this band 5.

It is now apparent that by constructing the lower edges of the side walls and also the bottom of the shovel in the manner described and placing the cutting edge at the lowest point and substantially midway between the front and rear ends the shovel is substantially balanced upon the cutting edge, which forms a fulcrum upon which the scraper may rock forwardly and rearwardly a limited distance without changing its fulcrum, which is preferably slightly below the lower edge of the side walls and bottom, so as to be free to dig into the ground when the scraper is drawn forwardly.

It is also apparent that when the shovel is rocked forwardly and drawn in the same direction the curved edges of the side walls cut into the earth in advance of the transverse cutting edge, as 6, and thereby block out the material to be excavated, permitting the material which is thus loosened to readily enter between the said walls and upon the bottom. This operation of loosening or blocking out the solid material in front of the cutting edge 6 is further facilitated by cutters 7, which in this instance consist of a pair of metal arms having their upper ends secured to the inner faces of the side walls and their lower ends offset inwardly toward each other a slight distance from said side walls and extended downwardly and forwardly beneath the plane of the circular lower edges of the sides and about midway between the cutting edge 6 and front end of the side walls, the intermediate portions of said arms being additionally supported by a transverse bar 8, tying the front ends of the side walls together and serving to additionally stiffen the same against lateral strain.

The hauling device for drawing the shovel forwardly in the act of filling or loading the same is pivotally connected to the shovel at a point in front of and above the cutting edge 6, and I therefore provide a tie-rod 9 at the upper front end of the shovel, said tie-rod having its opposite ends secured, preferably, to the extreme front ends of the side walls in proximity to their upper edges and in this instance above and in front of the tie-rod 8. This tie-rod or transverse bar 9 serves not only to additionally stiffen the front ends of the side walls against lateral strain, but forms a convenient anchorage for one end of a drafthook 10, by which the shovel is hauled forwardly in the act of loading the same. This draft-hook is constructed in the form of a triangular frame, the diverging arms having hook-shaped extremities, which are united by a transverse bar 11 and are detachably engaged with the tie-bar 9 and are also connected by cables 12 to the rear end of the shovel and in this instance to the opposite ends of the tie-bar 13, which unites and reinforces the upper rear ends of the sides 1.

When the hauling device 10 is attached to the front end of the shovel, as described, the cables 12 are slack to permit the hauling attachment to be readily attached and detached, and it is now apparent that when the hauling device is attached to the front end of the shovel and the power applied thereto for drawing the shovel forward the first effect is that the cutting edge 6 engages the ground and offers more or less resistance, which tends to draw the cutting edge deeper into the ground, and owing to the fact that the connections of the hauling device with the front end of the shovel is above the cutting edge or fulcrum the tendency is to rock said forward end of the shovel downwardly, which further facilitates the entrance of the front cutting edge of the bottom 2 into the ground. In other words, when the shovel is being drawn forward the point of connection of the draft-bar 10 with the front end of the scraper tends to rock into a position in a direct line between the cutting edge 6 and the power-cable; but as soon as the dirt or other material begins to accumulate in the shovel upon the bottom 2 the weight of this material tends to counteract the downward movement of the front end of the shovel; and by the time the shovel is filled this weight is sufficient to rock the rear end of the shovel downwardly, and thereby cause the shovel to ride upwardly toward the surface of the ground, and the dirt which would naturally accumulate in the front of the cutting edge becomes packed by contact with the bottom 2 and affords an inclined plane upon which the shovel readily rides to the surface.

In order that the shovel may extricate itself more readily, I provide the same with a top wall 3, which extends from the upper edge of the bottom 2 forwardly to a point directly over the cutting edge 6, so that the front edges of the bottom and top walls lie in substantially the same vertical plane, the said top wall being inclined forwardly and upwardly from its rear edge and together with the bottom and sides of the shovel forms a convenient bucket by which the dirt or other material may be hoisted and conveyed to any locality where it may be desired to discharge the same.

It will now be understood that when the shovel enters deeply into the earth and is therefore filled to its utmost capacity the resistance of the earth against the upper wall, which is above the line of draft, together with the weight of the material at the rear of the fulcrum or cutting edge 6, causes the rear end of the shovel to be tilted downwardly and rearwardly, which in turn causes the scraper to ride upwardly in an inclined plane and onto the surface of the ground. As soon as the dumping-place is reached an attendant disconnects the draft-bar 10 from the front end of the shovel and the movement of the hauling device, such as a winding-drum 15, (shown at dotted lines in Fig. 1,) the rear end of the shovel is rocked upwardly and forwardly upon the front edge 6 of the bottom as a fulcrum for discharging the load, and in order that the front edges of the bottom 2 and top 3 may be clear of the discharge-load I provide the front ends of the reinforcing-band 4 with forward extensions 16, as seen in Fig. 8, which are slightly deflected downwardly and engage the ground or other support in front of the cutting edge 6, which further elevates the rear end of the shovel, so that its bottom and top are entirely free from the discharged load. The return movement of the shovel is effected by means of a draft-cable 18, which is connected to the rear end of the shovel and preferably at substantially the same point at which the cables 12 are connected, while the other end of the cable is passed over one or more idlers or pulleys 19 and is attached to a rewinding-drum 20, as shown by dotted lines in Fig. 1, and it is now obvious that when the cable 18 is tensioned to return the shovel the latter is rocked rearwardly and downwardly, so that it rides upon the bottom 2, as seen in Fig. 9, it being understood that during this operation the hauling-cable and its drum 15 are released.

In some instances, as in deep excavations, it is necessary to hoist the shovel, with its load, a greater or less distance, and in Fig. 10 I have shown the shovel as adapted for such use, and it is apparent that while I have only described a few uses and have briefly explained the operation of the device it is equally applicable for many other uses and may be operated under different conditions from what has been herein set forth.

Having thus described my invention, what I claim, and desire to secure by Letters Patent, is—

1. An excavator having its sides of greatest depth substantially midway between their ends and a bottom extending from the rear ends forwardly along the lower edges of the sides and terminating at substantially their lowest points.

2. An excavator having a load-sustaining bottom and sides extending forwardly from the front cutting edge of the bottom.

3. An excavator having a bottom inclining upwardly and rearwardly from its front cutting edge, and sides secured by the bottom and extending forwardly beyond said cutting edge.

4. An excavator having a bottom inclining upwardly and rearwardly from its front cutting edge and sides secured to the bottom and extending forwardly beyond said cutting edge, the lower edges of the extensions inclining forwardly and upwardly from the bottom.

5. An excavator comprising a shovel having its sides of greatest depth substantially midway between their ends and a bottom extending from the rear ends forwardly along the lower edges of the sides and terminating substantially midway between the ends of the sides, and a draft device detachably connected to the front end of the shovel.

6. An excavator comprising a shovel having its sides of greatest depth substantially midway between their ends and a bottom extending from the rear ends forwardly along the lower edges of the sides and terminating substantially midway between the ends of the sides, and a draft device connected to the front and rear ends of the shovel, the front connection being detachable.

7. An excavator comprising a load-sustaining shovel having its sides of greatest depth substantially midway between their ends and a bottom extending from the rear ends forwardly along the lower edges of the sides and terminating substantially midway between the ends of the sides, and a draft device connected to the rear end of the shovel.

8. An excavator comprising a load-sustaining shovel having its sides of the greatest depth substantially midway between their ends and a bottom extending from their rear ends forwardly along the lower edges of the sides and terminating substantially midway between the ends of the said sides, in combination with separate draft devices connected to the opposite ends of the shovel for hauling the same in opposite directions.

9. An excavator comprising a shovel having its sides of greatest depth substantially midway between their ends and a bottom extending from their rear ends forwardly along the lower edges of the sides and terminating substantially midway between the ends of the said sides, in combination with separate draft devices connected to the opposite ends of the shovel for hauling the same in opposite directions, the front draft device being detachable, and a connection between the front draft device and the rear end of the shovel.

10. A shovel having top and bottom walls diverging forwardly from the rear end of the shovel and terminating substantially midway between the ends of the shovel.

11. A shovel having its sides of greatest depth substantially midway between their ends, and bottom and top walls united to the sides and extending forwardly from their rear ends.

12. A shovel having its sides of greatest depth substantially midway between their ends, and bottom and top walls united to the sides and extending forwardly in diverging planes from the rear ends of the sides, the front ends terminating substantially midway between the opposite ends of the sides.

13. A shovel having a bottom and sides united to each other, the sides extending forwardly beyond the front edge of the bottom and cutters secured to the shovel in front of the front edge of the bottom and projecting beneath the lower edges of the sides.

14. A shovel having its sides of greatest depth substantially midway between their ends and a bottom extending from the rear ends forwardly along the lower edges of the sides and terminating substantially midway between the ends of the sides, and arms secured to the sides and extending forwardly beyond their front ends.

15. A load-sustaining excavating-shovel having its bottom provided with a horizontal cutting-blade, the cutting edge of which is located substantially midway between the front and rear ends of the sides of the shovel.

In witness whereof I have hereunto set my hand on this 29th day of September, 1903.

THOMAS F. MOORE.

Witnesses:
H. E. CHASE,
MILDRED M. NOTT.